US012300157B2

(12) United States Patent
Lee et al.

(10) Patent No.: US 12,300,157 B2
(45) Date of Patent: May 13, 2025

(54) DISPLAY DEVICE AND DRIVING METHOD THEREOF

(71) Applicant: Samsung Display Co., LTD., Yongin-si (KR)

(72) Inventors: Hyun Dae Lee, Yongin-si (KR); Kang Bin Jo, Yongin-si (KR); Il Nam Kim, Yongin-si (KR); Go Eun Cha, Yongin-si (KR); Hee Chul Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 10 days.

(21) Appl. No.: 18/387,807

(22) Filed: Nov. 7, 2023

(65) Prior Publication Data

US 2024/0161684 A1 May 16, 2024

(30) Foreign Application Priority Data

Nov. 11, 2022 (KR) ........................ 10-2022-0150845

(51) Int. Cl.
*G09G 3/32* (2016.01)

(52) U.S. Cl.
CPC ....... *G09G 3/32* (2013.01); *G09G 2300/0426* (2013.01); *G09G 2300/0861* (2013.01); *G09G 2310/061* (2013.01); *G09G 2310/08* (2013.01)

(58) Field of Classification Search
CPC .......... G09G 3/32; G09G 3/3233; G09G 3/20; G09G 3/3266; G09G 2300/0426; G09G 2300/0861; G09G 2310/061; G09G 2310/08; G09G 2310/0202; G09G 2310/0243; G09G 2310/0264; G09G 2360/144; G06F 3/0412; G06F 3/0416; G06V 40/13
See application file for complete search history.

(56) References Cited

U.S. PATENT DOCUMENTS

| | | | | |
|---|---|---|---|---|
| 2003/0076295 A1* | 4/2003 | Nakajima | G06F 3/0412 | 345/156 |
| 2014/0118331 A1* | 5/2014 | Jeon | G09G 3/3614 | 345/99 |
| 2015/0116386 A1* | 4/2015 | Shin | G09G 3/3688 | 345/94 |

(Continued)

*Primary Examiner* — Christopher E Leiby
(74) *Attorney, Agent, or Firm* — CANTOR COLBURN LLP

(57) ABSTRACT

A display device includes: a display panel; an emission driver; a scan driver; and a timing controller. The display panel includes light emitting pixels and photosensitive pixels, where the photosensitive pixels are operated in an initialization period, a light exposure period and a sensing period. The emission driver supplies emission control signals to emission control lines connected to the light emitting pixels, based on an emission start signal. The scan driver supplies scan signals to scan lines connected to the light emitting pixels and the photosensitive pixels, based on a scan start signal. The timing controller generates the emission start signal having a single pulse of a gate-off level and the scan start signal having a single pulse of a gate-on level in a last frame period among frame periods corresponding to the light exposure period and in each of frame periods corresponding to the sensing period.

15 Claims, 9 Drawing Sheets

(56) References Cited

U.S. PATENT DOCUMENTS

| | | | | |
|---|---|---|---|---|
| 2015/0302793 | A1* | 10/2015 | In | G09G 5/18 345/82 |
| 2017/0186378 | A1* | 6/2017 | Na | G09G 3/3233 |
| 2018/0240405 | A1* | 8/2018 | Li | G09G 3/3258 |
| 2018/0246614 | A1* | 8/2018 | Hu | G09G 3/3258 |
| 2021/0376041 | A1* | 12/2021 | Lee | H10K 59/1213 |
| 2024/0203344 | A1* | 6/2024 | Yamamoto | G09G 3/20 |

* cited by examiner

DISPLAY DEVICE AND DRIVING METHOD THEREOF

This application claims priority to Korean Patent Application No. 10-2022-0150845, filed on Nov. 11, 2022, and all the benefits accruing therefrom under 35 U.S.C. § 119, the content of which in its entirety is herein incorporated by reference.

BACKGROUND

1. Field

Embodiments of the invention generally relate to a display device and a driving method thereof.

2. Description of the Related Art

As interest in information displays and demand for portable information media increase, research and commercialization has focused on display devices.

Display devices may provide a touch-based input method which allows a user to input information or commands intuitively and conveniently, in addition to conventional input systems, such as a button, a keyboard and a mouse. In addition, a method using a fingerprint which is one of biometric information, as a user authentication means for online banking, product purchase, security, and the like, has recently been proposed, and demands for display devices having a fingerprint recognition function have been increased.

SUMMARY

Embodiments provide a display device and a driving method of the display device, which can improve the accuracy of fingerprint sensing.

In accordance with an embodiment of the invention, a display device includes: a display panel which includes a plurality of light emitting pixels connected to emission control lines and scan lines, and a plurality of photosensitive pixels connected to the scan lines, where the plurality of photosensitive pixels is operated in an initialization period, a light exposure period, and a sensing period; an emission driver which supplies emission control signals to the emission control lines, based on an emission start signal; a scan driver which supplies scan signals to the scan lines, based on a scan start signal; and a timing controller which generates the emission start signal and the scan start signal, where the timing controller generates the emission start signal having a single pulse of a gate-off level and the scan start signal having a single pulse of a gate-on level in a last frame period among frame periods corresponding to the light exposure period and in each of frame periods corresponding to the sensing period.

In an embodiment, in each of the frame periods corresponding to the sensing period, the scan signals supplied to the scan lines connected to pixel rows of the display panel may not overlap each other.

In an embodiment, the timing controller may generate the emission start signal having a plurality of pulses of the gate-off level and the scan start signal having a plurality of pulses of the gate-on level in each of remaining frame periods except for the last frame period among the frame periods corresponding to the light exposure period and in a frame period corresponding to an initialization period.

In an embodiment, each of the plurality of pulses of the gate-off level in the emission start signal may overlap two pulses among the plurality of pulses of the gate-on level in the scan start signal.

In an embodiment, the plurality of pulses of the gate-off level in the emission start signal may overlap the plurality of pulses of the gate-on level in the scan start signal, respectively.

In an embodiment, the emission start signal may have four pulses of the gate-off level in each of the remaining frame periods except for the last frame period among the frame periods corresponding to the light exposure period and in the frame period corresponding to the initialization period.

In an embodiment, the plurality of photosensitive pixels may be further connected to reset lines. In such an embodiment, the display device may further include a reset unit which supplies a reset signal to the reset lines during the initialization period, in response to a touch input of a user.

In an embodiment, the plurality of photosensitive pixels may be further connected to readout lines. In such an embodiment, the display device may further include a readout circuit which supplies a sensing signal received from the readout lines to the timing controller during the sensing period.

In an embodiment, in a normal display mode, the timing controller may generate the emission start signal having a plurality of pulses of the gate-off level and the scan start signal having a plurality of pulses of the gate-on level in each of frame periods corresponding to the normal display mode.

In accordance with an embodiment of the invention, a method of driving a display device, including a plurality of light emitting pixels connected to emission control lines to which emission control signals are applied based on an emission start signal and scan lines to which scan signals are applied based on a scan start signal, and a plurality of photosensitive pixels connected to the scan lines, includes: initializing the plurality of photosensitive pixels, in response to a touch input of a user; exposing the plurality of photosensitive pixels to light output from the plurality of light emitting pixels to be reflected by a body of the user; and sensing a sensing signal from the plurality of photosensitive pixels, where, in a last frame period among frame periods corresponding to the exposing and in each of frame periods corresponding to the sensing, the emission start signal has a single pulse of a gate-off level, and the scan start signal has a single pulse of a gate-on level.

In an embodiment, in each of the frame periods corresponding to the sensing, the scan signals supplied to the scan lines connected to pixel rows of a display panel of the display device may not overlap each other.

In an embodiment, in each of remaining frame periods except for the last frame period among the frame periods corresponding to the exposing and in a frame period corresponding to the initializing, the emission start signal may have a plurality of pulses of the gate-off level, and the scan start signal may have a plurality of pulses of the gate-on level.

In an embodiment, each of the plurality of pulses of the gate-off level in the emission start signal may overlap two pulses among the plurality of pulses of the gate-on level in the scan start signal.

In an embodiment, the plurality of pulses of the gate-off level in the emission start signal may overlap the plurality of pulses of the gate-on level in the scan start signal, respectively.

In an embodiment, the emission start signal may have four pulses of the gate-off level in each of the remaining frame periods except for the last frame period among the frame periods corresponding to the exposing and in the frame period corresponding to the initializing.

BRIEF DESCRIPTION OF THE DRAWINGS

The above and other features of embodiments of the invention will become more apparent by describing in further detail embodiments thereof with reference to the accompanying drawings, in which.

DETAILED DESCRIPTION

Figure 1:
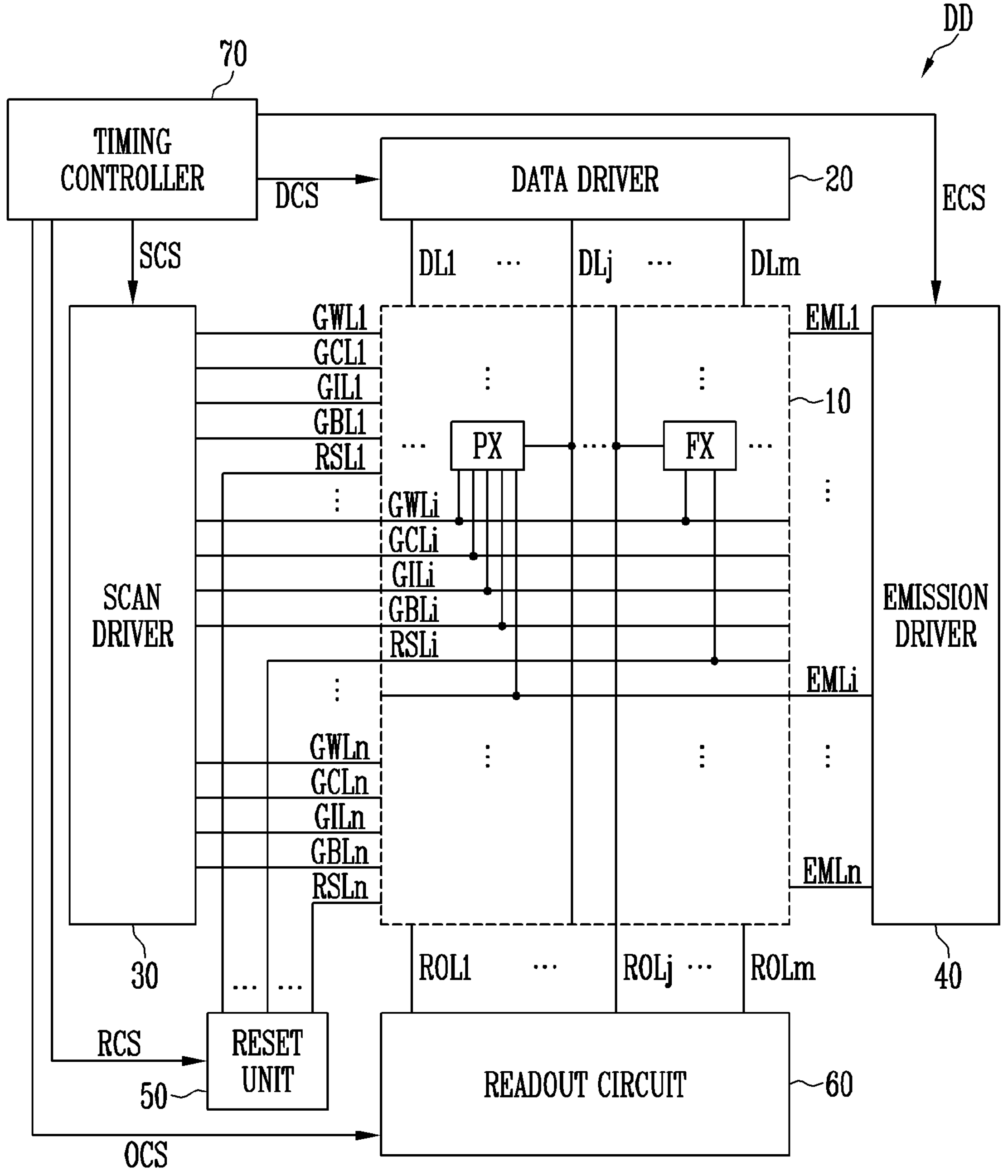
FIG. 1 is a diagram illustrating a display device in accordance with an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the invention.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "or" means "and/or." As used herein, the term "and/or" includes any and all combinations of one or more of the associated listed items.

It will be further understood that the terms "comprises" and/or "comprising," or "includes" and/or "including", when used in this specification, specify the presence of stated features, integers, steps, operations, elements, and/or components, but do not preclude the presence and/or addition of one or more other features, integers, steps, operations, elements, components, and/or groups thereof.

In the entire specification, when an element is referred to as being "connected" or "coupled" to another element, it can be directly connected or coupled to the another element or be indirectly connected or coupled to the another element with one or more intervening elements interposed therebetween.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a diagram illustrating a display device DD in accordance with an embodiment of the invention.

Referring to FIG. 1, the display device DD in accordance with an embodiment of the invention may include a display panel 10, a data driver 20, a scan driver 30, an emission driver 40, a reset unit 50, a readout circuit 60, and a timing controller 70.

The display device DD may be driven in a first mode or a second mode based on a predetermined use condition. The first mode may be a normal display mode for displaying an image corresponding image data, and the second mode may be a fingerprint sensing mode for sensing a touch input, a fingerprint of a user, or the like.

The display device DD may be driven in the first mode or the second mode according to various conditions including a predetermined specific use environment, contents, an application program, and/or a choice of a user. In an embodiment, for example, when executing user verification by a specific application program, the mode of the display device DD may be changed from the first mode to the second mode.

The display panel 10 may include a plurality of light emitting pixels PX connected to data lines DL1 to DLm, scan lines GWL1 to GWLn, GCL1 to GCLn, GIL1 to GILn, and GBL1 to GBLn, and emission control lines EML1 to EMLn, and a plurality of photosensitive pixels FX connected to scan lines GWL1 to GWLn, reset lines RSL1 to RSLn, and readout lines ROL1 to ROLm. Here, m and n may be natural numbers greater than 1. The plurality of photosensitive pixels FX may be fingerprint sensing pixels for sensing a touch input of a user, a fingerprint of the use, or the like. The plurality of light emitting pixels PX and the plurality of photosensitive pixels FX may be disposed in a same layer of the display panel 10. Also, the plurality of light emitting pixels PX and the plurality of photosensitive pixels FX may be disposed in the whole of a display area in which an image is displayed on the display panel 10 or in a specific area of the display area.

Figure 3:
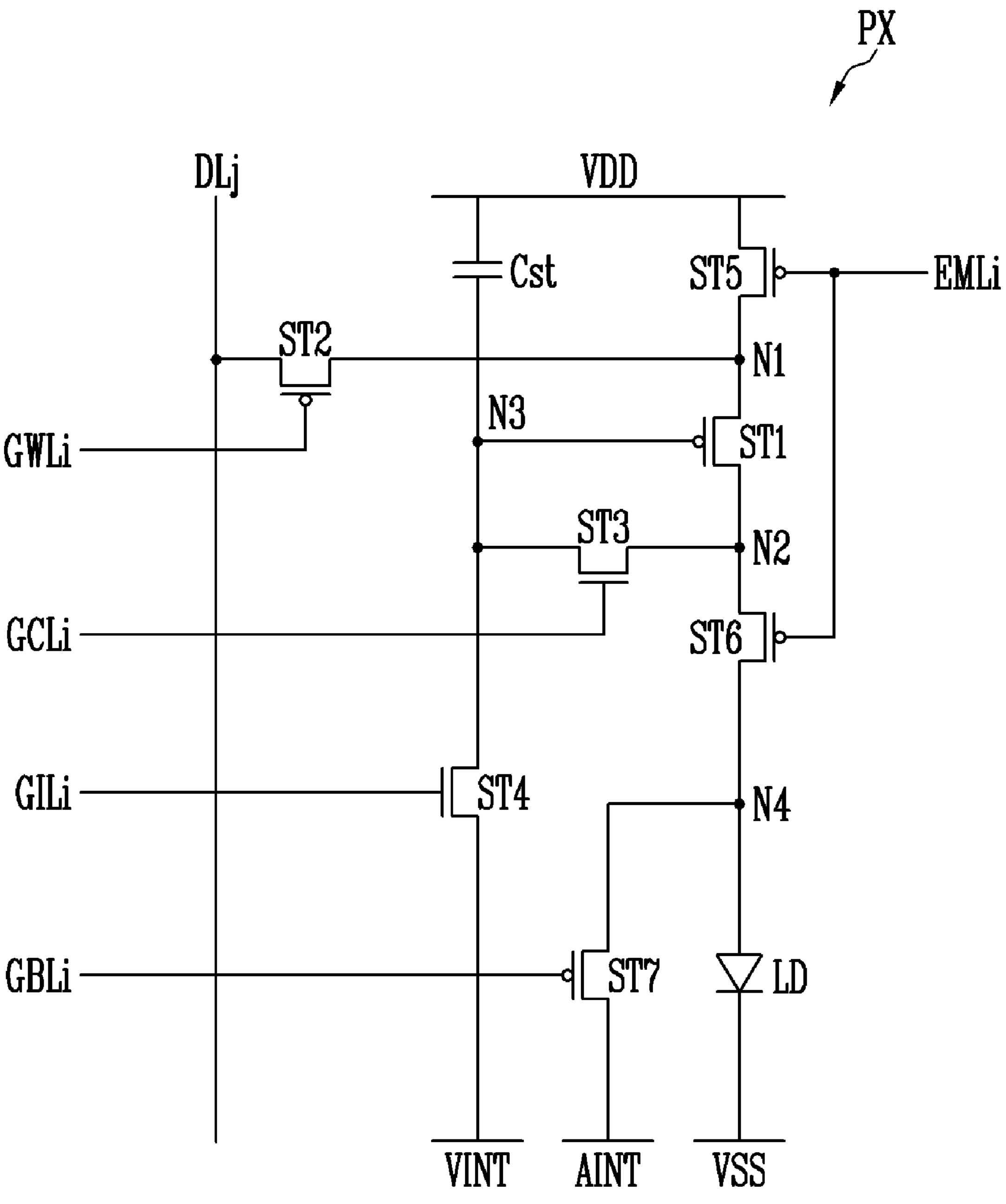
FIG. 3 is a diagram illustrating a light emitting pixel in accordance with an embodiment of the invention.

Each of the plurality of light emitting pixels PX may include at least one pixel transistor ST, a light emitting element LD, and a storage capacitor Cst (see FIG. 3). The light emitting element LD may receive a driving current corresponding to a data voltage applied to a gate electrode, thereby emitting light. The light emitting element LD may emit light with a predetermined luminance corresponding to a magnitude of the driving current.

Each of the plurality of light emitting pixels PX may be connected to at least one power supply line, and receive various voltages from the power supply line. In an embodiment, for example, each of the plurality of light emitting pixels PX may receive, from the power supply line, a first power voltage VDD, a second power voltage VSS, a first initialization power voltage VINT, and a second initialization power voltage AINT (see FIG. 3).

Figure 5:
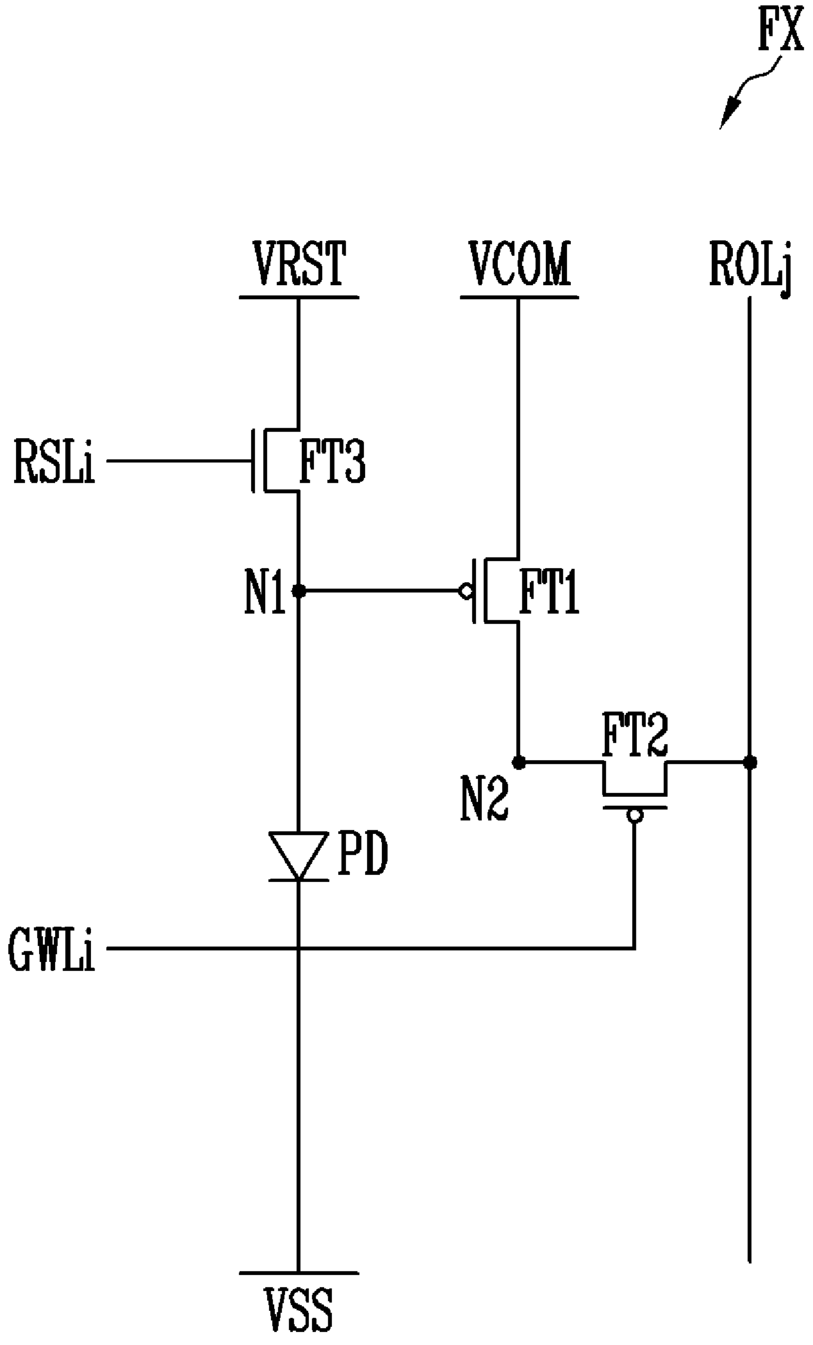
FIG. 5 is a diagram illustrating a photosensitive pixel in accordance with an embodiment of the invention.

Each of the plurality of photosensitive pixels FX may include at least one sensing transistor FT and a light receiving element PD (see FIG. 5). The plurality of photosensitive pixels FX may receive light, thereby outputting a sensing signal. In an embodiment, for example, the plurality of photosensitive pixels FX may output a sensing signal through the readout lines ROL1 to ROLm and supply the sensing signal to the timing controller 70.

Each of the plurality of photosensitive pixels FX may be connected to at least one power supply line, and receive various voltages from the power supply line. In an embodiment, for example, each of the plurality of photosensitive pixels FX may receive, from the power supply line, a reset voltage VRST, a common voltage VCOM, and the second driving voltage VSS (see FIG. 5).

The data driver 20 may receive digital video data and a third control signal DCS from the timing controller 70. The data driver 20 may convert the digital video data into data signals and supply the data signals to the data lines DL1 to DLm in response to the third control signal DCS.

The scan driver 30 may receive a first control signal SCS from the timing controller 70. The scan driver 30 may supply scan signals to the scan lines GWL1 to GWLn, GCL1 to GCLn, GIL1 to GILn, GBL1 to GBLn, and RSL1 to RSLn in response to the first control signal SCS.

An embodiment where the scan lines GWL1 to GWLn, GCL1 to GCLn, GIL1 to GILn, GBL1 to GBLn, and RSL1 to RSLn are connected to a single scan driver 30 is illustrated in FIG. 1. However, in an alternative embodiment, each of the scan lines GWL1 to GWLn, GCL1 to GCLn, GIL1 to GILn, GBL1 to GBLn, and RSL1 to RSLn may be provided in a form in which each of the scan lines GWL1 to GWLn, GCL1 to GCLn, GIL1 to GILn, GBL1 to GBLn, and RSL1 to RSLn is connected to a separate scan driver.

The emission driver 40 may receive a second control signal ECS from the timing controller 70. The emission driver 40 may supply emission control signals to the emission control lines EML1 to EMLn in response to the second control signal ECS.

Each emission control signal may have a gate-off voltage at which a transistor supplied with the emission control signal can be turned off. In an embodiment, for example, a high-level emission control signal may be supplied to a P-type transistor, and a low-level emission control signal may be supplied to an N-type transistor. Accordingly, a transistor receiving each emission control signal may be tuned off in response to the emission control signal, to maintain an off-state during a period in which the emission control signal is supplied.

An embodiment where the scan driver 30 and the emission driver 40 are provided as components separate from each other is illustrated in FIG. 1. However, in an alternative embodiment, the scan driver 30 and the emission driver 40 may be integrated into one driving circuit, one module, or the like.

The reset unit 50 may receive a fourth control signal RCS from the timing controller 70. When a touch input of a user exists, the reset unit 50 may supply reset signals to the reset line RSL1 to RSLn in response to the fourth control signal RCS.

The readout circuit 60 may receive a fifth control signal OCS from the timing controller 70. The readout circuit 60 may provide the timing controller 70 with a sensing signal received from the readout lines ROL1 to ROLm in response to the fifth control signal OCS.

The timing controller 70 may be supplied with input grayscales and control signals from a host system such as an application processor (AP) through a predetermined interface. The control signals may include a data enable signal, a vertical synchronization signal, a horizontal synchronization signal, or the like.

The timing controller 70 may generate the first control signal SCS, the second control signal ECS, the third control signal DCS, the fourth control signal RCS, and the fifth control signal OCS, based on the input grayscales and the control signals. The first control signal SCS may be supplied to the scan driver 30, the second control signal ECS may be supplied to the emission driver 40, the third control signal DCS may be supplied to the data driver 20, the fourth control signal RCS may be supplied to the reset unit 50, and the fifth control signal OCS may be supplied to the readout circuit 60. The timing controller 70 may realign the input grayscales and supply the realigned input grayscales to the data driver 20.

Figure 2:
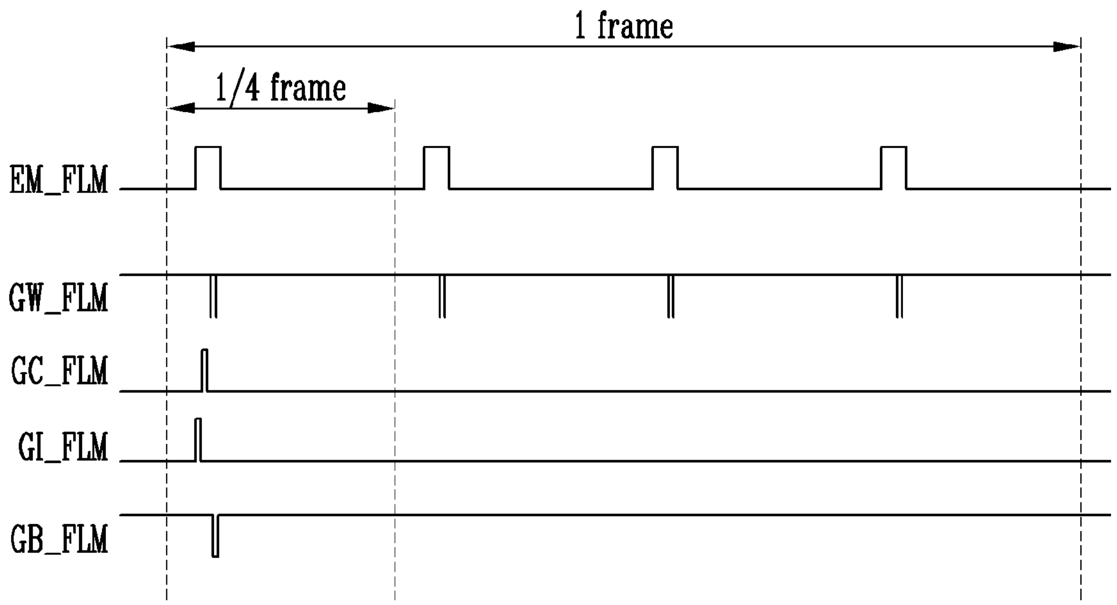
FIG. 2 is a diagram illustrating scan start signals and an emission start signal.

The first control signal SCS may include a first scan start signal GW_FLM, a second scan start signal GC_FLM, a third scan start signal GI_FLM, a fourth scan start signal GB_FLM, and clock signals (see FIG. 2). The first scan start signal GW_FLM may control a start timing of a first scan signal GW. The second scan start signal GC_FLM may control a start timing of a second scan signal GC. The third scan start signal GI_FLM may control a start timing of a third scan signal GI. The fourth scan start signal GB_FLM may control a start timing of a fourth scan signal GB. The clock signals may be used to shift the first to fourth scan start signals GW_FLM to GB_FLM.

The second control signal ECS may include an emission start signal EM_FLM and clock signals. The emission start signal EM_FLM may control a supply timing of an emission control signal EM. The clock signals may be used to shift the emission start signal EM_FLM.

The third control signal DCS may include a source start signal and clock signals. The source start signal may control a start timing of data sampling. The clock signals may be used to control a sampling operation.

The fourth control signal RCS may include a reset start signal and clock signals. The reset start signal may control a start timing of a reset signal. The clock signals may be used to shift the reset start signal.

The fifth control signal OCS may include a sensing start signal and clock signals. The sensing start signal may control a start timing of a sensing signal. The clock signals may be used to shift the sensing start signal.

The timing controller 70 may generate sensing data, based on the sensing signal received from the readout circuit 60, to recognize a fingerprint pattern of a user.

FIG. 2 is a diagram illustrating scan start signals and an emission start signal. In FIG. 2, waveforms of scan start signals GW_FLM to GB_FLM and an emission start signal EM_FLM during a period of one frame or one frame period (1 frame) are exemplarily illustrated.

Referring to FIGS. 1 and 2, the timing controller 70 may generate an emission control signal EM_FLM having a plurality of pulses of a gate-off level (e.g., a logic high level) during a period of one frame (1 frame). In an embodiment, for example, the timing controller 70 may generate an emission start signal EM_FLM having four pulses of the gate-off level during a period of one frame, and accordingly, a screen dragging phenomenon occurring in low grayscale driving by using an emission start signal EM_FLM having a single (i.e., one) pulse of the gate-off level during a period of one frame (1 frame) can be eliminated or effectively prevented. As described above, a method of supplying a signal having a plurality of pluses during a period of one frame may be defined as motion clarity (MC) driving.

The timing controller 70 may generate a first scan start signal GW_FLM having a plurality of pulses of a gate-on level (e.g., a logic low level) during a period of one frame (1 frame). Also, the timing controller 70 may generate a first scan start signal GW_FLM in which the pulse of the gate-on level are toggled several times during each period in which the emission control signal EM_FLM has the pulse of the gate-off level. In an embodiment, for example, the timing controller 70 may generate a first scan start signal GW_FLM having eight pulses of the gate-on level during a period of one frame (1 frame), the first scan start signal GW_FLM in which the pulse of the gate-on level is toggled twice during each period in which the emission start signal EM_FLM has the pulse of the gate-off level, and accordingly, a ghost phenomenon occurring in the MC driving can be eliminated or effectively prevented.

The timing controller 70 may generate a second scan start signal GC_FLM having a single (i.e., one) pulse of a gate-on level (e.g., a logic high level) during a period of one frame (1 frame). Also, the timing controller 70 may generate a third scan start signal GI_FLM having a single (i.e., one) pulse of a gate-on level (e.g., a logic high level) during a period of one frame (1 frame). Also, the timing controller 70 may generate a fourth scan start signal GB_FLM having a single (i.e., one) pulse of a gate-on level (e.g., a logic low level) during a period of one frame (1 frame).

As described above, the timing controller 70 may be operated using the MC driving with respect to the emission control signal EM_FLM and the first scan start signal GW_FLM, and may not be operated using the MC driving with respect to the second scan start signal GC_FLM, the third scan start signal GI_FLM, and the fourth scan start signal GB_FLM.

FIG. 3 is a diagram illustrating a light emitting pixel PX in accordance with an embodiment of the invention. In FIG. 3, a light emitting pixel PX disposed in an i-th pixel row and a j-th pixel column among the plurality of light emitting pixels PX is exemplarily illustrated. Here, i is a natural number which is equal to or greater than 1 and is equal to or less than n, and j is a natural number which is equal to or greater than 1 and is equal to or less than m.

Referring to FIG. 3, the light emitting pixel PX may include pixel transistors ST1, ST2, ST3, ST4, ST5, ST6, and ST7, a light emitting element LD, and a storage capacitor Cst.

A first electrode of a first pixel transistor ST1 (or driving transistor) may be connected to a first node N1, a second electrode of the first pixel transistor ST1 may be connected to a second node N2, and a gate electrode of the first pixel transistor ST1 may be connected to a third node N3. The first pixel transistor ST1 may control a driving current flowing from a first power voltage VDD to a second power voltage VSS via the light emitting element LD.

A first electrode of a second pixel transistor ST2 (or switching transistor) may be connected to a data line (or a j-th data line) DLj, a second electrode of the second pixel transistor ST may be connected to the first node N1, and a gate electrode of the second pixel transistor ST2 may be connected to a first scan line (or an i-th first scan line) GWLi. The second pixel transistor ST2 may be turned on when a first scan signal (or an i-th first scan signal) GW[i] having a gate-on level is supplied to the first scan line GWLi, to electrically connect the data line DLj and the first electrode of the first pixel transistor ST1 to each other.

A first electrode of a third pixel transistor ST3 (or diode connection transistor) may be connected to the second node N2, a second electrode of the third pixel transistor ST3 may be connected to the third node N3, and a gate electrode of the third pixel transistor ST3 may be connected to a second scan line (or an i-th second scan line) GCLi. The third pixel transistor ST3 may be turned on when a second scan signal (or an i-th second scan signal) GC[i] having a gate-on level is supplied to the second scan line GCLi, to electrically connect the second electrode of the first pixel transistor ST1 and the third node N3 to each other. That is, when the third pixel transistor ST3 is turned on, the first pixel transistor ST1 may be connected in a diode form.

A first electrode of a fourth pixel transistor ST4 (or gate initialization transistor) may be connected to the third node N3, a second electrode of the fourth transistor ST4 may be connected to a first initialization power line to which a first initialization power voltage VINT is applied, and a gate electrode of the fourth pixel transistor ST4 may be connected to a third scan line (or an i-th third scan line) GILL The fourth pixel transistor ST4 may be turned on when a third scan signal (or an i-th third scan signal) GI[i] having a gate-on level is supplied to the third scan line GILi, to supply the first initialization power voltage VINT to the third node N3.

A first electrode of a fifth pixel transistor ST5 (or first emission transistor) may be connected to a first power line to which the first power voltage VDD is applied, and a second electrode of the fifth pixel transistor ST5 may be connected to the first node N1, and a gate electrode of the fifth pixel transistor ST5 may be connected to an emission control line (or an i-th emission control line) EMLi. The fifth pixel transistor ST5 may be turned off when an emission control signal (or an i-th emission control signal) EM[i] having a gate-off level is supplied to the emission control line EMLi, and be turned on in other cases.

A first electrode of a sixth pixel transistor ST6 (or second emission transistor) may be connected to the second node N2, a second electrode of the sixth pixel transistor ST6 may be connected to a fourth node N4, and a gate electrode of the sixth pixel transistor ST6 may be connected to the emission control line EMLi. The sixth pixel transistor ST6 may be turned off when the emission control signal EM[i] having the gate-off level is supplied to the emission control signal EMLi, and be turned on in other cases.

A first electrode of a seventh pixel transistor ST7 (or anode initialization transistor may be connected to the fourth node N4, a second electrode of the seventh pixel transistor ST7 may be connected to a second initialization power line to which a second initialization power voltage AINT is applied, and a gate electrode of the seventh pixel transistor ST7 may be connected to a fourth scan line (or an i-th fourth scan line) GBLi. The seventh pixel transistor ST7 may be turned on when a fourth scan signal (or an i-th fourth scan signal) GB[i] having a gate-on level is supplied to the fourth scan line GBLi, to supply the second initialization power voltage AINT to the fourth node N4. The second initialization power voltage AINT may be set to a voltage lower than a data signal.

In an embodiment, as shown in FIG. 3, each of some transistors ST1, ST2, ST5, ST6, and ST7 among the pixel transistors ST1, ST2, ST3, ST4, ST5, ST6, and ST7 may be a P-type (e.g., a P-type metal-oxide-semiconductor PMOS) transistor, and each of the other transistors ST3 and ST4 may be an N-type (e.g., an N-type metal-oxide-semiconductor NMOS) transistor. However, in an alternative embodiment, each of the pixel transistors ST1, ST2, ST3, ST4, ST5, ST6, and ST7 may be the P-type (e.g., PMOS) transistor or the N-type (e.g., NMOS) transistor.

A first electrode of the storage capacitor Cst may be connected to the first power line to which the first power voltage VDD is applied, and a second electrode of the storage capacitor Cst may be connected to the third node N3. The storage capacitor Cst may store a voltage corresponding to the data signal and a threshold voltage of the first pixel transistor ST1.

A first electrode of the light emitting element LD may be connected to the fourth node N4, and a second electrode of the light emitting element LD may be connected to a second power line to which the second power voltage VSS is applied. At least one light emitting element LD may be provided in the light emitting pixel PX, and the kind of the light emitting element LD is not limited thereto. In an embodiment, for example, the light emitting element LD may be configured as an organic light emitting element, be configured as an inorganic light emitting element such as a micro light emitting diode (LED) or a quantum dot LED, or be configured as a light emitting element including a combination of an organic material and an inorganic material.

Figure 4:
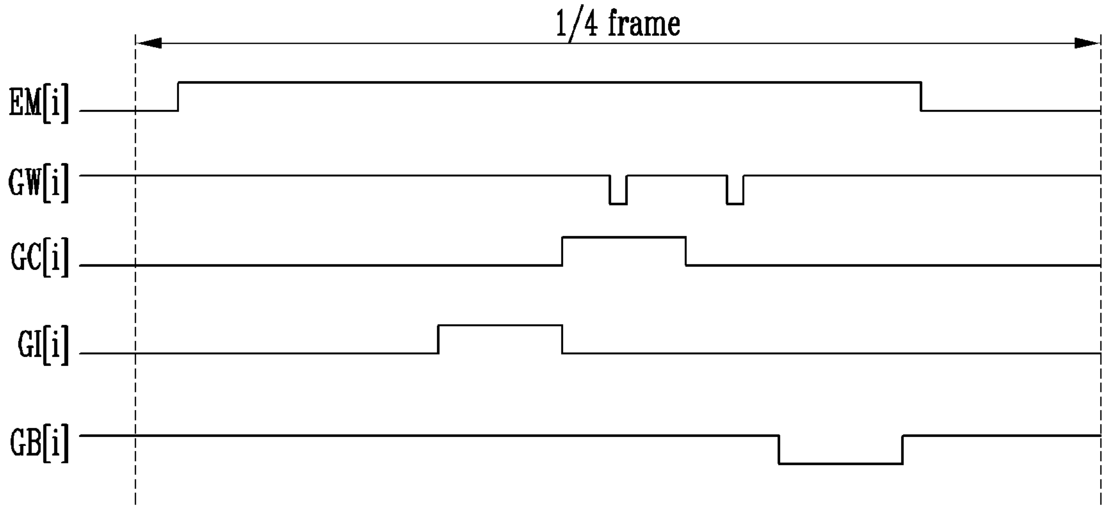
FIG. 4 is a diagram illustrating an operation of the light emitting pixel shown in FIG. 3.

FIG. 4 is a diagram illustrating an operation of the light emitting pixel PX shown in FIG. 3. In FIG. 4, the scan signals GW[i] to GB[i] and the emission control signal EM[i] according to the scan start signals GW_FLM to GB_FLM and the emission start signal EM_FLM, which are included in a partial frame period (¼ frame) shown in FIG. 2 are exemplarily enlarged and illustrated.

Referring to FIGS. 2 to 4, first, an emission control signal EM[i] having a gate-off level (e.g., a logic high level) may be supplied to the emission control line EMLi. The fifth pixel transistor ST5 and the sixth pixel transistor ST6 may maintain a turn-off state in response to the emission control signal EM[i] having the gate-off level.

Next, a third scan signal GI[i] having a gate-on level (e.g., a logic high level) may be supplied to the third scan line GILL The fourth pixel transistor ST4 may maintain a turn-on state in response to the third scan signal GIN having the gate-on level. Accordingly, the gate electrode of the first pixel transistor ST1 is initialized to the first initialization power voltage VINT, to prevent a hysteresis phenomenon of the driving transistor.

Next, a second scan signal GC[i] having a gate-on level (e.g., a logic high level) may be supplied to the second scan line GCLi. The third pixel transistor ST3 may maintain the turn-on state in response to the second scan signal GC[i] having the gate-on level. Accordingly, the gate electrode and the second electrode (i.e., a drain electrode) of the first pixel transistor ST1 are connected to each other, such that the first pixel transistor ST1 can be diode-connected.

Next, a first scan signal GW[i] having a gate-on level (e.g., a logic low level) may be supplied to the first scan line GWLi. The second pixel transistor ST2 may maintain the turn-on state in response to the first scan signal GW[i] having the gate-on level. Accordingly, a data voltage corresponding to a data signal can be written in the storage capacitor Cst through the pixel transistors ST2, ST1, and ST3. Subsequently, the first scan signal GW[i] having the gate-on level is further supplied to the first scan line GWLi once, so that the above-described driving process can be repeatedly performed. Accordingly, the ghost phenomenon occurring in the MC driving can be eliminated or effectively prevented.

Next, a fourth scan signal GB[i] having a gate-on level (e.g., a logic low level) may be supplied to the fourth scan line GBLi. The seventh pixel transistor ST7 may maintain the turn-on state in response to the fourth scan signal GB[i] having the gate-on level. Accordingly, the first electrode (i.e., an anode electrode) of the light emitting element LD can be initialized to the second initialization voltage AINT.

Finally, an emission control signal EM[i] having a gate-on level (e.g., a logic low level) may be supplied to the emission control line EMLi. The fifth pixel transistor ST5 and the sixth pixel transistor ST6 may maintain the turn-on state in response to the emission control signal EM[i] having the gate-on level. Accordingly, a current path through which the first power voltage VDD, the pixel transistors ST5, ST1, and ST6, the light emitting element LD, and the second power voltage VSS are connected to each other is formed, so that a driving current can flow through the current path. The driving current may flow by a magnitude corresponding to the data voltage stored in the storage capacitor Cst, and accordingly, the light emitting element LD can emit light with a desired luminance.

Subsequently, the emission control signal EM[i] having the gate-off level is further supplied to the emission control line EMLi three times during the remaining period in one frame (1 frame) period, so that the above-described driving process can be repeatedly performed, and accordingly, the screen dragging phenomenon occurring in low grayscale driving can be eliminated or effectively prevented. That is, the emission control signal EM[i] having the gate-off level may be supplied four times during one frame (1 frame) period.

In addition, the first scan signal GW[i] having the gate-on level is further supplied to the first scan line GWLi six times during the remaining period in one frame (1 frame) period, so that the above-described driving process can be repeatedly performed. The first scan signal GW[i] having the gate-on level may be toggled twice during each period in which the emission control signal EM[i] has the gate off level. That is, the first scan signal GW[i] having the gate-on level is supplied eight times during one frame (1 frame) period, and may be supplied twice during each period in which the emission control signal EM[i] has the gate-off level.

FIG. 5 is a diagram illustrating a photosensitive pixel FX in accordance with an embodiment of the invention. In FIG. 5, a photosensitive pixel FX disposed on an i-th pixel row and a j-th pixel column among the plurality of photosensitive pixels FX is exemplarily illustrated. Here, i is a natural number which is equal to or greater than 1 and is equal to or less than n, and j is a natural number which is equal to or greater than 1 and is equal to or less than m.

Referring to FIG. 5, the photosensitive pixel FX may include sensing transistors FT1 to FT3 and a light receiving element PD, but the invention is not limited thereto.

A first electrode of a first sensing transistor FT1 (or amplifying transistor) may be connected to a common power line to which a common voltage VCOM is applied, a second electrode of the first sensing transistor FT1 may be connected to a second node N2, and a gate electrode of the first sensing transistor FT1 may be connected to a first node N1. The first sensing transistor FT1 may supply the common voltage VCOM to the second node N2, in response to a voltage of the first node N1. Also, the first sensing transistor FT1 may control a sensing current flowing through the first sensing transistor FT1, in response to the voltage of the first node N1. The sensing current may be supplied as a sensing signal to a readout line (or an j-th readout line) ROLj via a second sensing transistor FT2.

A first electrode of the second sensing transistor FT2 (or output transistor) may be connected to the second node N2, a second electrode of the second sensing transistor FT2 may be connected to the readout line ROLj, and a gate electrode of the second sensing transistor FT2 may be connected to the first scan line (or the i-th first scan line) GWLi. That is, the same scan line, i.e., the first scan line GWLi may be connected to the gate electrode of the second sensing transistor FT2 and the gate electrode of the second pixel transistor ST2. The second sensing transistor FT2 may be turned on when the first scan signal GW[i] having the gate-on level is supplied to the first scan line GWLi, to electrically connect the second electrode of the first sensing transistor FT1 and the readout line ROLj to each other.

A first electrode of a third sensing transistor FT3 (or reset transistor) may be connected to a reset power line to which a reset voltage VRST is applied, a second electrode of the third sensing transistor FT3 may be connected to the first node N1, and a gate electrode of the third sensing transistor FT3 may be connected to a reset line (or an i-th reset line) RSLi. The third sensing transistor FT3 may be turned on when a reset signal (an i-th reset signal) RS[i] having a gate-on level is supplied to the reset line RSLi, to supply the reset voltage VRST to the first node N1. The first node N1, i.e., the gate electrode of the first sensing transistor FT1 may be reset by the reset voltage VRST.

Each of some transistors FT1 and FT2 among the sensing transistors FT1 to FT3 may be a P-type (e.g., PMOS) transistor, and the other transistor FT3 may be an N-type (e.g., NMOS) transistor. However, the invention is not limited thereto. For example, each of the sensing transistors FT1 to FT3 may be the P-type (e.g., PMOS) transistor or the N-type (e.g., NMOS) transistor.

A first electrode of the light receiving element PD may be connected to the first node N1, and a second electrode of the light receiving element PD may be connected to the second power line to which the second power voltage VSS is applied. The light receiving element LD may recognize a fingerprint pattern of a user, based on light reflected from a finger of the user. In an embodiment, for example, the light receiving element PD may convert energy of light reflected by a ridge or valley of the finger of the user into an electrical signal (current or voltage) formed between the first electrode and the second electrode of the light receiving element PD, and the converted electrical signal may flow from the first node N1 to the second power line. The light reflected by the ridge or valley of the finger of the user to reach the light receiving element PD may be light obtained as light output from the light emitting element LD of the light emitting pixel PX is reflected by the ridge or valley of the finger of the user.

The light receiving element LD may be configured as or defined by a photo transistor or a photo diode, but the invention is not limited thereto. The light receiving element PD may correspond to an optical sensor for converting optical energy into electrical energy, and use a photovoltaic effect that current flowing based on a change of the intensity of light.

Figure 6:
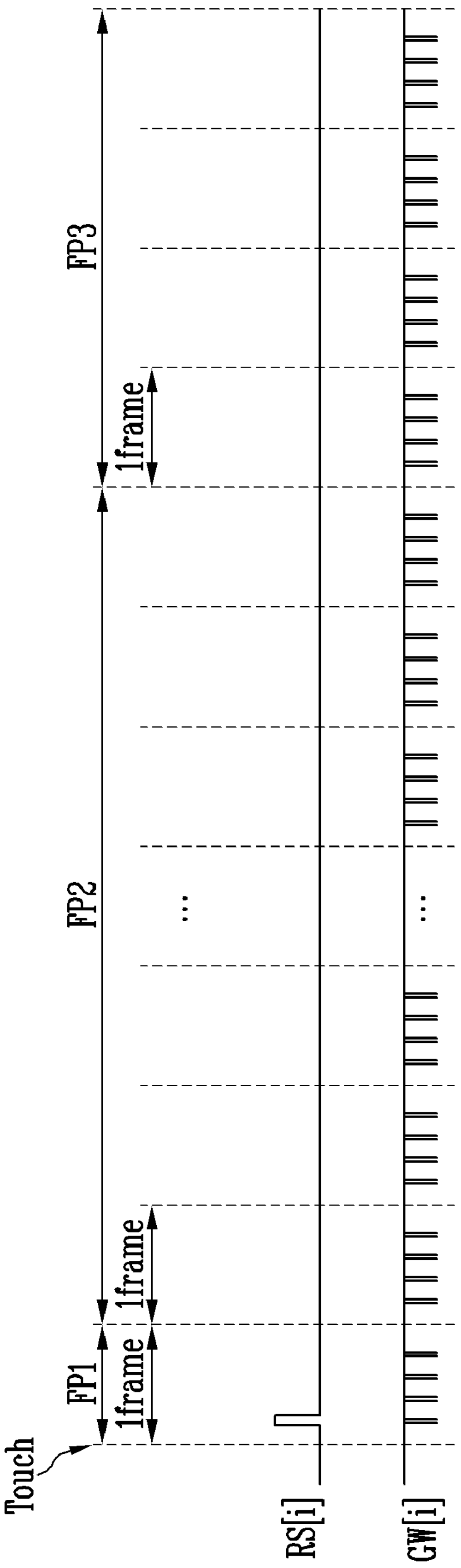
FIG. 6 is a diagram illustrating an operation of the photosensitive pixel shown in FIG. 5.

FIG. 6 is a diagram illustrating an operation of the photosensitive pixel shown in FIG. 5. In FIG. 6, an operational process of the photosensitive pixel FX operated in first to third periods FP1 to FP3, corresponding to a touch input Touch of a user is exemplarily illustrated.

Referring to FIGS. 5 and 6, when a touch input Touch of a user exists, a reset signal (or the i-th reset signal) RS[i] having a gate-on level (e.g., a logic high level) may be supplied to the reset line RSL during a frame period corresponding to a first period FP1 (or an initialization period). The third sensing transistor FT3 may maintain the turn-on state in response to the reset signal RS[i] having the gate-on level. Accordingly, the first node N1 can be reset to the reset voltage VRST. That is, the light receiving element PD can be reset to the reset voltage VRST during the first period FP1.

Although an embodiment where the photosensitive pixel FX is reset during one frame (1 frame) period is illustrated in FIG. 6, the invention is not limited thereto. In an alternative embodiment, for example, the photosensitive pixel FX may be reset during a plurality of frame periods corresponding to the touch input Touch of the user.

Next, during a plurality of frame periods corresponding to a second period FP2 (or a light exposure period), the light receiving element PD may generate photocharges corresponding to light received from the outside, and the generated photocharges may be accumulated at the first node N1. The light which the light receiving element PD receives from the outside may be light output from the light emitting element LD. A potential of the first node N1, i.e., a potential of the gate electrode of the first sensing transistor FT1 may vary in proportion to an amount of the photocharges accumulated at the first node N1.

Next, a first scan signal GW[i] having a plurality of pulses of a gate-on level (e.g., a logic high level) may be supplied to the first scan line SWLi during a plurality of frame periods corresponding to a third period FP3 (or sensing period). In an embodiment, for example, the plurality of frame periods corresponding to the third period FP3 may be 4 frame periods. The second sensing transistor FT2 may maintain the turn-on state in response to the first scan signal GW[i] having the gate-on level. Accordingly, a sensing signal corresponding to a sensing current flowing through the first sensing transistor FT1 may output to the readout line ROLj.

In such an embodiment, since the photosensitive pixel FX shares the first scan line GWLi with the light emitting pixel PX, the first scan signal GW[i] having the plurality of pulses of the gate-on level may be supplied to the first scan line GWLi during a frame period corresponding to the first period (or the initialization period) FP1 and the second period (or the light exposure period) FP2.

Figure 7:
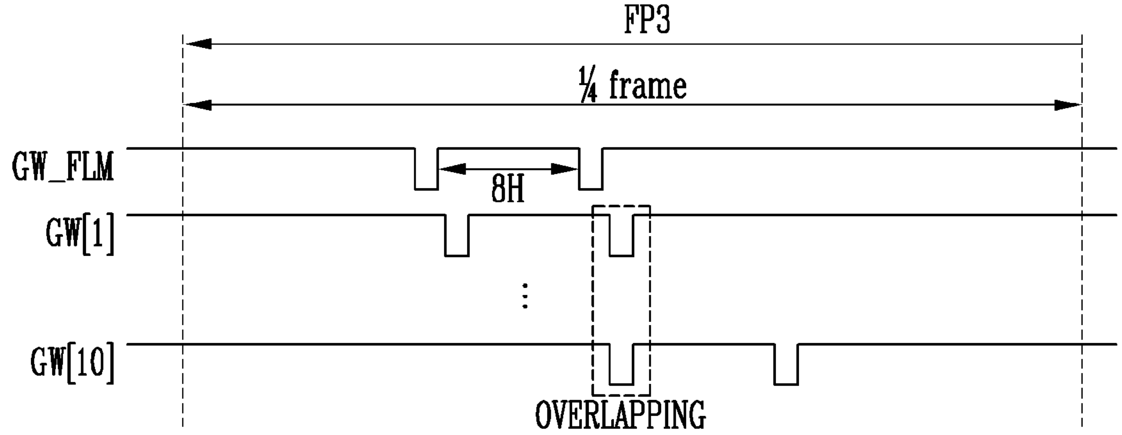
FIGS. 7 and 8 are diagrams illustrating an undesired phenomenon occurring in an operation in accordance with a comparative example.
Figure 8:
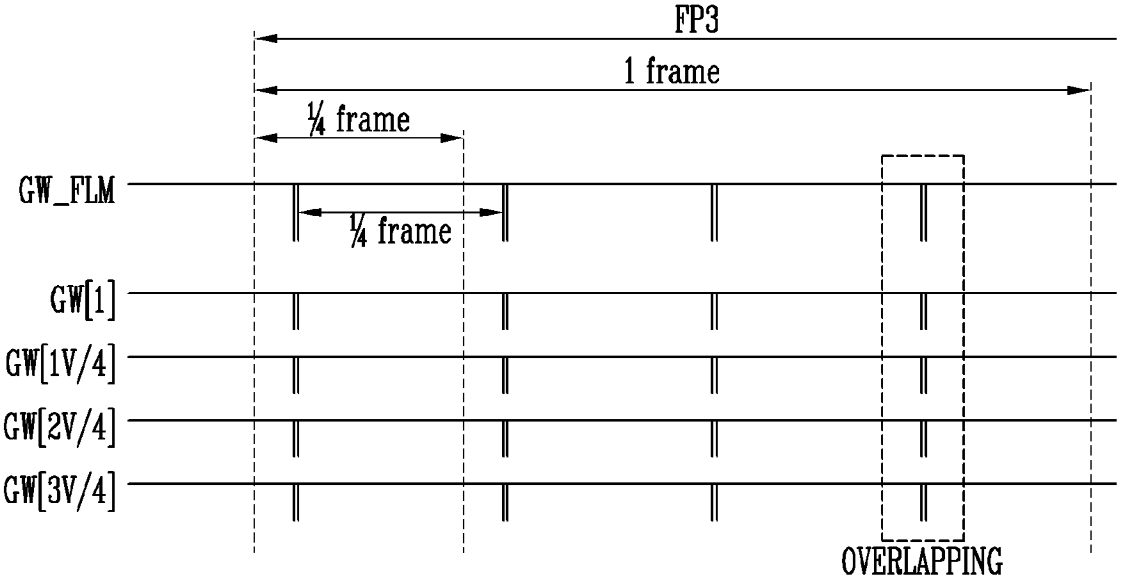

FIGS. 7 and 8 are diagrams illustrating an undesired phenomenon occurring in an operation in accordance with a comparative example. FIG. 7 exemplarily illustrates waveforms of first scan signals according to a first scan start signal GW_FLM corresponding to ¼ frame shown in FIG. 2, and FIG. 8 exemplarily illustrates waveforms of first scan signals according to a first scan start signal GW_FLM corresponding to 1 frame shown in FIG. 2. For convenience of description, it is assumed that the first scan signals shown in FIGS. 7 and 8 are supplied in a third period (or sensing period) FP3 in an operation period of the photosensitive pixels FX.

In FIGS. 7 and 8, it is assumed that an interval between the pulses of the gate-on level in the first scan start signal GW_FLM corresponds to 8 horizontal periods 8H. However, the invention is not limited thereto.

In FIG. 8, it is assumed that a vertical resolution of the display device is V. For example, that the vertical resolution of the display device is V may mean that the number of light emitting pixels disposed on a pixel column is V. In other words, that vertical resolution of the display device is V may mean that the number of photosensitive pixels disposed on a pixel column is V. For example, V may be a multiple of 4.

Referring to FIGS. 6 and 7, first scan signals GW[1] to GW[10] having two pulses of the gate-on level may be sequentially generated based on the first scan start signal GW_FLM having two pulses of the gate-on level (i.e., toggled twice). The first scan signal GW[1] may mean a signal supplied to a first pixel row, and the scan signal GW[10] may mean a signal supplied to a tenth pixel row.

When an interval between pulses of the gate-on level corresponds to 8 horizontal periods 8H, a second pulse of the gate-on level in the first scan signal GW[1] supplied to the first pixel row a first pulse of the gate-on level in the first scan signal GW[10] supplied to the tenth pixel row may overlap each other during a partial frame (¼ frame) corresponding to the third period FP3. That is, as the first scan signals GW[1] and GW[10] are simultaneously supplied to two pixel rows, photosensitive pixels FX disposed on the two pixel rows may be simultaneously operated. As descried above, as the first scan signal GW is toggled twice at a certain time interval, the two pixel rows are simultaneously activated (or selected), and therefore, the accuracy of fingerprint sensing may be deteriorated.

Referring to FIG. 8, during one frame (1 frame) period corresponding to the third period FP3, first scan signals GW[1], GW[1V/4], GW[2V/4], and GW[3V/4] having eight pulses of the gate-on level may be sequentially generated based on the first scan start signal GW_FLM having eight pulses of the gate-on level. The first scan signal GW[1] may means a signal supplied to the first pixel row, the first scan signal GW[1V/4] may mean a signal supplied to a 1V/4th pixel rows, the first scan signal GW[2V/4] may mean a signal supplied to a 2V/4th pixel row, and the first scan signal GW[3V/4] may mean a signal supplied to a 3V/4th pixel row.

Since the pulse of the gate-on level is toggled twice for every ¼ frame period, an interval between pulses of the gate-on level, which are toggled twice, may correspond to the ¼ frame period. Accordingly, pulses of the gate-on level in the first scan signal GW[1] supplied to the first pixel row, the first scan signal GW[1V/4] supplied to the 1V/4-th pixel rows, the first scan signal GW[2V/4] supplied to the 2V/4-th pixel row, and the first scan signal GW[3V/4] supplied to the 3V/4-th pixel row may overlap each other. That is, as the first scan signal GW[1], GW[1V/4], GW[2V/4], and GW[3V/4] are simultaneously supplied to four pixel rows, photosensitive pixels FX disposed on the four pixel rows are simultaneously operated, and therefore, the accuracy of fingerprint sensing may be deteriorated.

In addition, referring to FIGS. 7 and 8, since each of the first scan signal GW[1V/4] supplied to the 1V/4-th pixel rows, the first scan signal GW[2V/4] supplied to the 2V/4-th pixel row, and the first scan signal GW[3V/4] supplied to the 3V/4-th pixel row is toggled twice at a certain interval, two pixel rows may be simultaneously activated. As a result, a total of 8 (4×2) pixel rows are simultaneously activated at a specific time by the first scan signal GW in the MC driving, so that photosensitive pixels FX are simultaneously operated. Therefore, the accuracy of fingerprint sensing may be deteriorated.

In an embodiment of the invention, pixel rows may be sequentially activated during each frame period corresponding to the third period FP3, in which photosensitive pixels FX are operated, to effectively prevent deterioration of the accuracy of fingerprint sensing described above. That is, during each frame period corresponding to the third period FP3, pulses of the gate-on level in first scan signals GW supplied to each pixel row may not overlap each other. This will be described in more detail with reference to FIG. 9.

Figure 9:
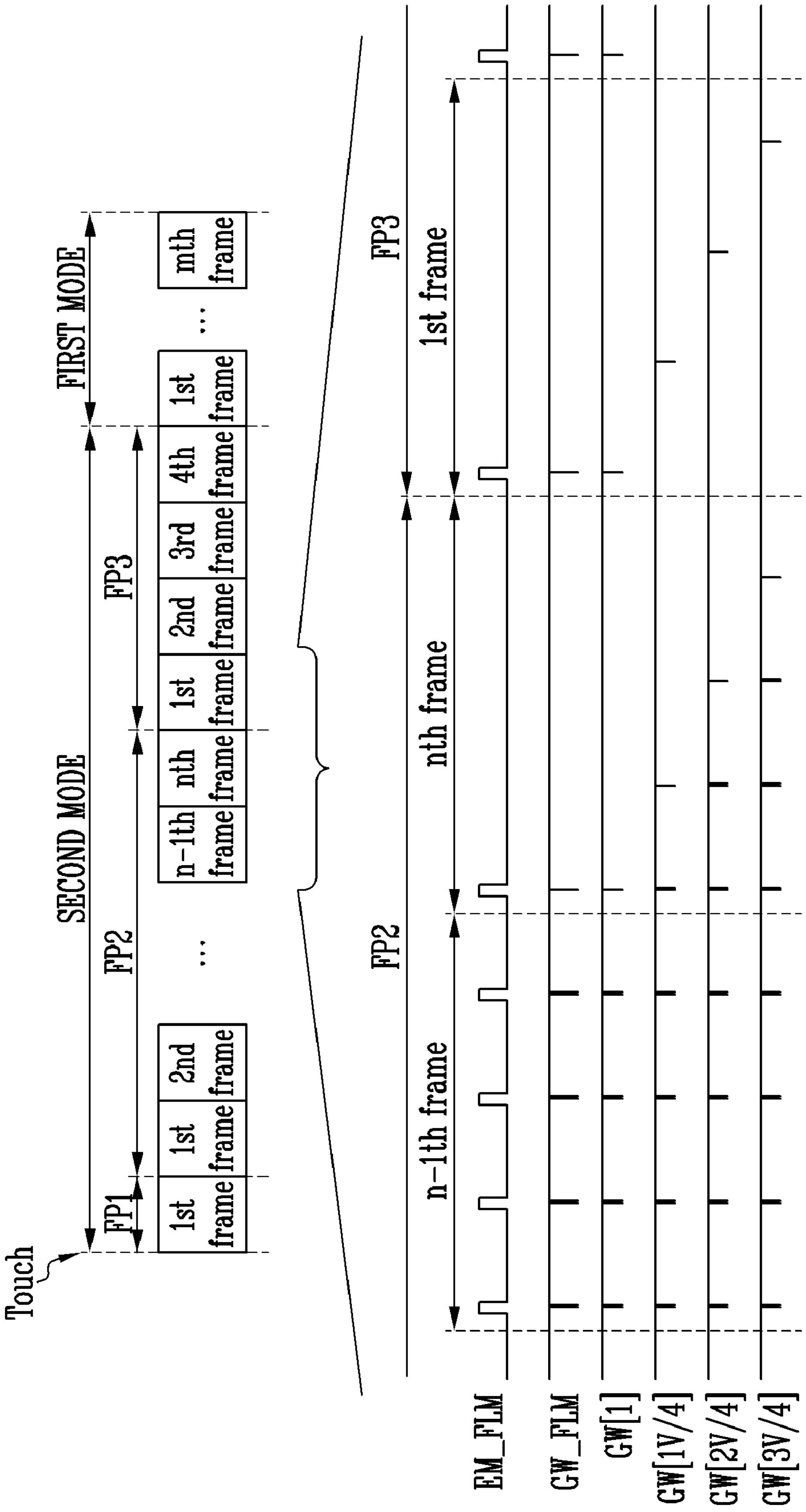
FIG. 9 is a diagram illustrating a driving method of the display device in accordance with an embodiment of the invention.

FIG. 9 is a diagram illustrating a driving method of the display device in accordance with an embodiment of the invention.

Referring to FIGS. 1 and 9, in an embodiment, when the display device DD is operated in the second mode, the timing controller 70 may control a timing of MC driving. In such an embodiment, when the display device DD is operated in the fingerprint sensing mode, corresponding to a touch input Touch of a user, the timing controller 70 may suspend the MC driving during a partial period in the operation period of the photosensitive pixel FX.

When the timing controller 70 performs the MC driving, the timing controller 70 may generate an emission start signal EM_FLM having four pulse of the gate-off during one frame period. Also, the timing controller 70 may generate a first scan start signal GW_FLM having eight pulses of the gate-on level during one frame period. The first scan start signal GW_FLM may be toggled twice during each period in which the emission start signal EM_FLM has a pulse of the gate-off level. That is, the first scan start signal GW_FLM may have two pulses of the gate-on level during each period in which the emission start signal EM_FLM has a pulse of the gate-off level.

The timing controller 70 may perform the MC driving during a frame period corresponding to a first period (or an initialization period) FPI in which the photosensitive pixel FX is operated. In other words, the timing controller 70 may generate an emission start signal EM_FLM having a plurality of pulses of the gate-off level and a first scan start signal GW_FLM having a plurality of pulses of the gate-on level during a frame period corresponding to the first period FP1 in which the photosensitive pixel FX is operation.

The timing controller 70 may generate an emission start signal EM_FLM having one pulse (or a single pulse) of the gate-off level and a first scan start signal GW_FLM one pulse (or a single pulse) of the gate-off level during a last frame (e.g., an n-th frame) among frame periods corresponding to a second period FP2 (or a light exposure period) in which the photosensitive pixel FX is operated. That is, the timing controller 70 may suspend the MC driving during the last frame period among the frame periods corresponding to the second period FP2 in which the photosensitive pixel FX is operated.

On the other hand, the timing controller 70 may generate an emission start signal EM_FLM having a plurality of pulses of the gate-off level and a first scan start signal GW_FLM having a plurality of pulses of the gate-on level during the other frame (e.g., an i-th frame to an (n−1)-th frame) periods except the last frame period among the frame periods corresponding to the second period FP2 in which the photosensitive pixel FX is operated. That is, the timing controller 70 may perform the MC driving during the other frame periods except the last frame period among the frame periods corresponding to the second period FP2 in which the photosensitive pixel FX is operated.

The timing controller 70 may generate an emission start signal EM_FLM having one pulse (or a single pulse) of the gate-off level and a first scan start signal GW_FLM having one pulse (or a single pulse) of the gate-off level during frame periods (e.g., first to fourth frames) corresponding to a third period (or sensing period) FP3 in which the photosensitive pixel FX is operated. That is, the timing controller 70 may suspend the MC driving during the frame periods corresponding to the third period FP3 in which the photosensitive pixel FX is operated.

Accordingly, during the frame periods corresponding to the third period FP3 in which the photosensitive pixel FX is operated, a pulse of the gate-on level in a first scan signal, which is supplied to a second sensing transistor FT2 of a photosensitive pixel FX of each pixel row (e.g., a pixel row of GW[1]) may not overlap a pulse of the gate-on level in a first scan signal, which is supplied to a second sensing transistor FT2 of a photosensitive pixel FX of another pixel row (e.g., a pixel row of GW[1V/4]). That is, unlike FIGS. 7 and 8, the first scan signals GW[1], GW[1V/4], GW[2V/4], and GW[3V/4] may not overlap each other. That is, as the pixel rows are sequentially opened (or selected) (i.e., one pixel row is sequentially opened (or selected) during frame periods corresponding to the third period FP3 in which the photosensitive pixel FX is operated, the accuracy of fingerprint sensing can be improved.

When the fingerprint sensing is completed, the mode of the display device DD may be changed from the second mode to the first mode. When the display device DD is operated in the first mode, the timing controller 70 may again perform the MC driving during frame periods (e.g., first to m-th frames) corresponding to the first mode. That is, when the display device DD is operated in the normal display mode, the timing controller 70 may again generate an emission start signal EM_FLM having a plurality of pulses of the gate-off level and a first scan start signal GW_FLM having a plurality of pulses of the gate-on level.

Figure 10:
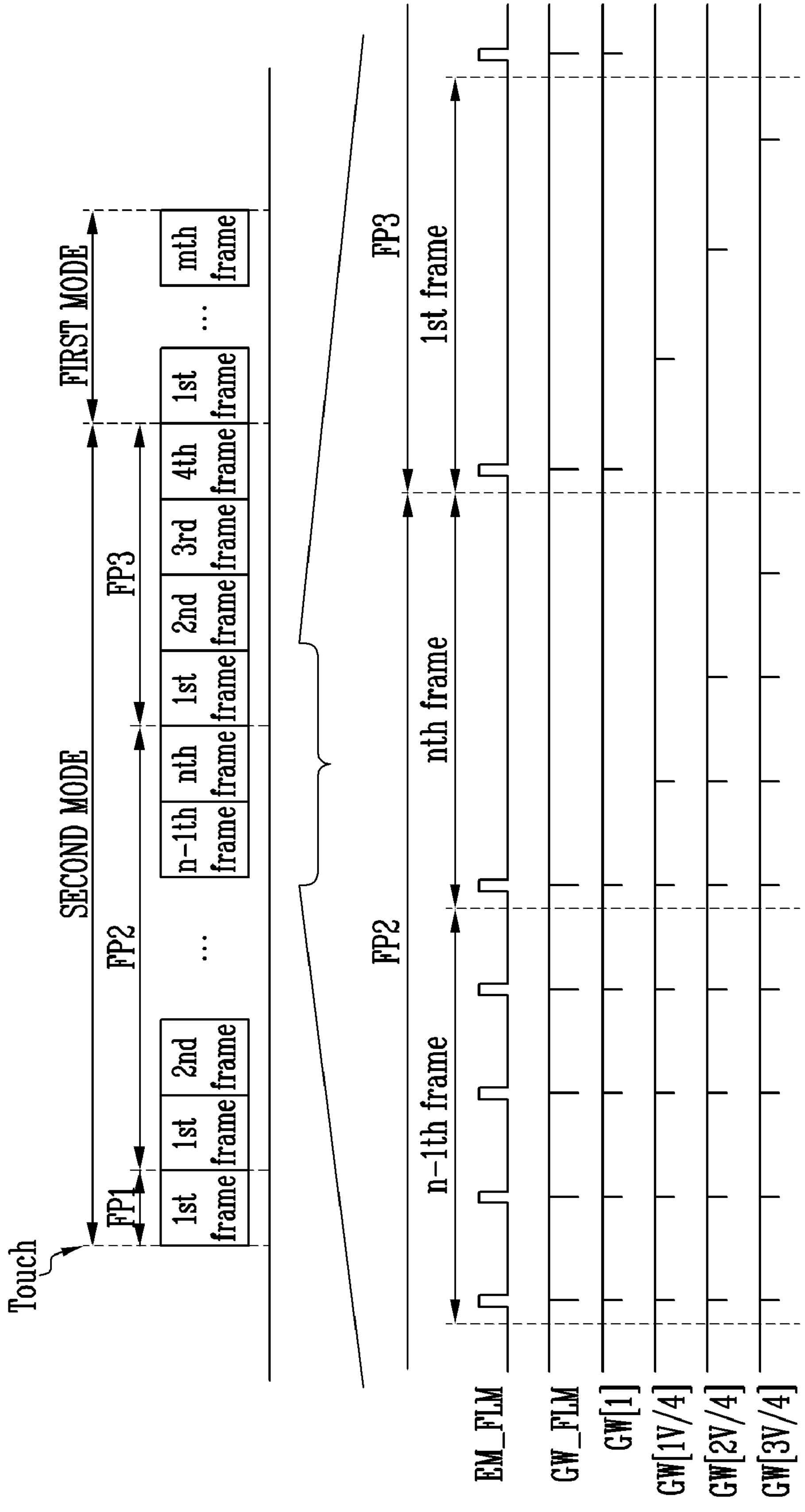
FIG. 10 is a diagram illustrating a driving method of the display device in accordance with an embodiment of the invention.

FIG. 10 is a diagram illustrating a driving method of the display device in accordance with another embodiment of the invention. In FIG. 10, any repetitive detailed description of the same or like elements as those described above with reference to FIG. 9 will be omitted, and features different from those in FIG. 9 will be mainly described.

Referring to FIG. 10, when the timing controller 70 performs MC driving, the timing controller 70 may generate an emission start signal EM_FLM having four pulses of the gate-off level during one frame period. Also, the timing controller 70 may generate a first scan start signal GW_FLM having four pulses of the gate-on level during one frame period. In such an embodiment, the first scan start signal GW_FLM may be toggled once during each period in which the emission start signal EM_FLM has a pulse of the gate-off level. That is, the first scan start signal GW_FLM may have one pulse of the gate-on level during each period in which the emission start signal EM_FLM has a pulse of the gate-off level.

As described above, even when the first scan start signal GW_FLM is toggled once, the timing controller 70 generates an emission start signal EM_FLM having one pulse of the gate-off level and a first scan start signal GW_FLM having one pulse of the gate-off level during a last frame (e.g., an nth frame) among frame periods corresponding to the second period FP2 in which the photosensitive pixel FX is operated and frame periods corresponding to the third period FP3 in which the photosensitive pixel FX is operated, so that the accuracy of fingerprint sensing can be improved.

In accordance with embodiments of the invention, a display device and a driving method thereof, which can improve the accuracy of fingerprint sensing, are provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel which includes a plurality of light emitting pixels connected to emission control lines and scan lines, and a plurality of photosensitive pixels connected to the scan lines, wherein the plurality of photosensitive pixels is operated in an initialization period, a light exposure period and a sensing period;

an emission driver which supplies emission control signals to the emission control lines, based on an emission start signal;

a scan driver which supplies scan signals to the scan lines, based on a scan start signal; and a timing controller which generates the emission start signal and the scan start signal, wherein the timing controller generates the emission start signal having a single pulse of a gate-off level and the scan start signal having a single pulse of a gate-on level in a last frame period among frame periods corresponding to the light exposure period and in each of frame periods corresponding to the sensing period.

2. The display device of claim 1, wherein, in each of the frame periods corresponding to the sensing period, the scan signals supplied to the scan lines connected to pixel rows of the display panel do not overlap each other.

3. The display device of claim 1, wherein the timing controller generates the emission start signal having a plurality of pulses of the gate-off level and the scan start signal having a plurality of pulses of the gate-on level in each of remaining frame periods except for the last frame period among the frame periods corresponding to the light exposure period and in a frame period corresponding to the initialization period.

4. The display device of claim 3, wherein each of the plurality of pulses of the gate-off level in the emission start signal overlaps two pulses among the plurality of pulses of the gate-on level in the scan start signal.

5. The display device of claim 3, wherein the plurality of pulses of the gate-off level in the emission start signal overlap the plurality of pulses of the gate-on level in the scan start signal, respectively.

6. The display device of claim 3, wherein the emission start signal has four pulses of the gate-off level in each of the remaining frame periods except for the last frame period among the frame periods corresponding to the light exposure period and in the frame period corresponding to the initialization period.

7. The display device of claim 1, wherein the plurality of photosensitive pixels are further connected to reset lines, and wherein the display device further comprises a reset unit which supplies a reset signal to the reset lines during the initialization period, in response to a touch input of a user.

8. The display device of claim 1, wherein the plurality of photosensitive pixels are further connected to readout lines, and wherein the display device further comprises a readout circuit which supplies a sensing signal received from the readout lines to the timing controller during the sensing period.

9. The display device of claim 1, wherein, in a normal display mode, the timing controller generates the emission start signal having a plurality of pulses of the gate-off level and the scan start signal having a plurality of pulses of the gate-on level in each of frame periods corresponding to the normal display mode.

10. A method of driving a display device including a plurality of light emitting pixels connected to emission control lines to which emission control signals are applied based on an emission start signal and scan lines to which scan signals are applied based on a scan start signal, and a plurality of photosensitive pixels connected to the scan lines, the method comprising:

initializing the plurality of photosensitive pixels, in response to a touch input of a user;

exposing the plurality of photosensitive pixels to light output from the plurality of light emitting pixels to be reflected by a body of the user; and sensing a sensing signal from the plurality of photosensitive pixels, wherein, in a last frame period among frame periods corresponding to the exposing and in each of frame periods corresponding to the sensing, the emission start signal has a single pulse of a gate-off level, and the scan start signal has a single pulse of a gate-on level.

11. The method of claim 10, wherein, in each of the frame periods corresponding to the sensing, the scan signals supplied to the scan lines connected to pixel rows of a display panel of the display device do not overlap each other.

12. The method of claim 10, wherein, in each of remaining frame periods except for the last frame period among the frame periods corresponding to the exposing and in a frame period corresponding to the initializing, the emission start signal has a plurality of pulses of the gate-off level, and the scan start signal has a plurality of pulses of the gate-on level.

13. The method of claim 12, wherein each of the plurality of pulses of the gate-off level in the emission start signal overlaps two pulses among the plurality of pulses of the gate-on level in the scan start signal.

14. The method of claim 12, wherein the plurality of pulses of the gate-off level in the emission start signal overlap the plurality of pulses of the gate-on level in the scan start signal, respectively.

15. The method of claim 12, wherein the emission start signal has four pulses of the gate-off level in each of the remaining frame periods except for the last frame period among the frame periods corresponding to the exposing and in the frame period corresponding to the initializing.

* * * * *